No. 868,705. PATENTED OCT. 22, 1907.
C. F. SCHELL.
HAND TRUCK.
APPLICATION FILED OCT. 23, 1905.

2 SHEETS—SHEET 1

Witnesses:
Julius Lanker
Harry Harris

Charles F. Schell, Inventor:
By Emil Neuhart
Attorney.

No. 868,705. PATENTED OCT. 22, 1907.
C. F. SCHELL.
HAND TRUCK.
APPLICATION FILED OCT. 23, 1905.
2 SHEETS—SHEET 2.
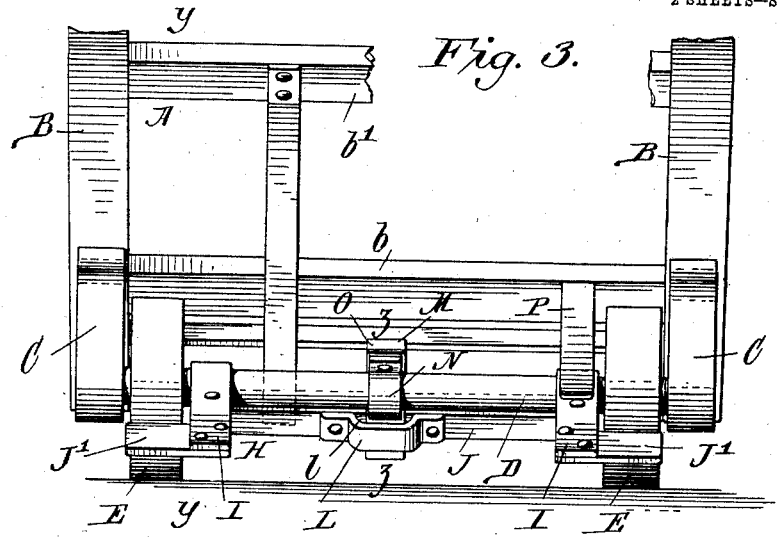
Witnesses:
Julius Lankes
Harry Harris
Charles F. Schell, Inventor.
By Emil Neukark
Attorney

UNITED STATES PATENT OFFICE.

CHARLES F. SCHELL, OF BUFFALO, NEW YORK, ASSIGNOR OF ONE-HALF TO GEORGE SCHELL, OF BUFFALO, NEW YORK.

HAND-TRUCK.

No. 868,705.　　　　　　Specification of Letters Patent.　　　　　Patented Oct. 22, 1907.

Application filed October 23, 1905. Serial No. 283,936.

*To all whom it may concern:*

Be it known that I, CHARLES F. SCHELL, a citizen of the United States, residing at Buffalo, in the county of Erie and State of New York, have invented certain new and useful Improvements in Hand-Trucks, of which the following is a specification.

This invention relates to improvements in hand-trucks, and more particularly to attachments for the same, by means of which the truck may be held against rearward movement when in the act of forcing the nose of the same under an object to be loaded onto the truck and also when swinging the object down onto the truck.

The object of my invention is the production of a suitable brake-mechanism for hand-trucks which is mounted loosely on the axle of the truck and which is arranged to normally hang loosely and evenly thereon so that the body of the truck may be swung into any position or angle without offering the least obstruction to the forward or backward movement of the truck; to provide foot-operated mechanism to swing the brake-device into its braking position and to so construct the foot-operated mechanism that the user of the truck can rest his entire weight thereon and thereby acquire an elevated position to permit him to stoop forward between the side bars of the truck and obtain an extended reach forward in order to more conveniently and with greater ease swing rearward the object to be loaded onto the truck; to so construct the brake-device that when stepping onto the foot-operated mechanism the truck is held against movement and both hands of the user are free for taking hold of the object to be placed onto the truck; and also to construct the brake-device that by stepping lightly on the foot-operated mechanism, the truck may be moved forward during the act of forcing the nose under the object, but cannot be moved rearward.

Further objects are to provide for a quick release of the brake-mechanism after the truck-body is swung to a position to permit the truck to be moved forward; and to otherwise improve on devices of this character.

With these and other objects in view the invention consists in the arrangement, construction, and combination of parts to be hereinafter described and particularly pointed out in the appended claims.

Figure 1:
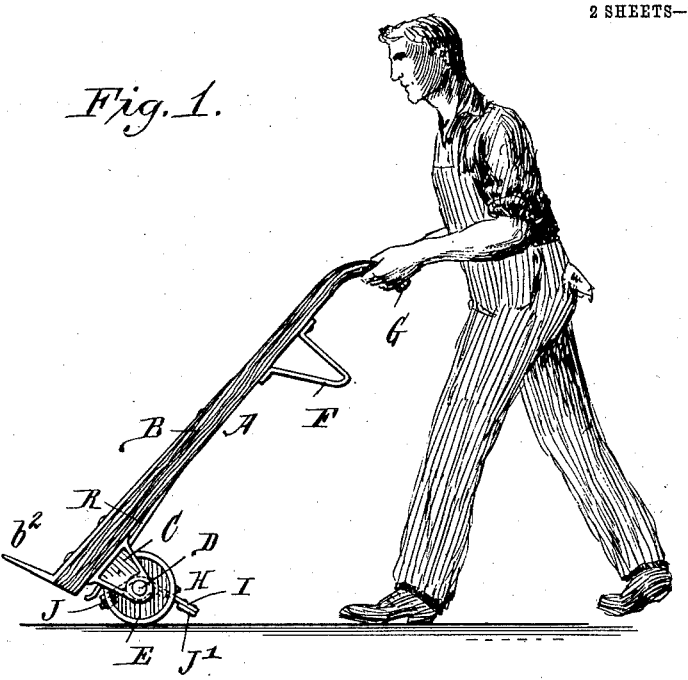
Figure 2:

In the accompanying drawings,—Figure 1 is a side elevation of a hand-truck embodying my invention, showing the normal position of the brake-mechanism. Fig. 2 is a similar view showing the braking-position of the brake-mechanism. Fig. 3 is an enlarged rear or bottom view of the truck when in the position shown in Fig. 1. Fig. 4 is a longitudinal section taken on line $y-y$, Fig. 3; the brake-mechanism being shown in its normal or free position. Fig. 5 is a similar section showing the truck swung into substantially the position shown in Fig. 2, with the brake-mechanism in its braking or engaged position. Fig. 6 is a longitudinal section taken on line $z-z$, Fig. 3. Fig. 7 is a detached perspective view of the brake-device.

Referring to the drawings in detail, like letters of reference refer to like parts throughout the several figures.

The letter A designates the body of the truck which is of common construction and comprises side bars B connected by cross-bars $b$, $b^1$, and a metallic nose or lip $b^2$ adapted to be thrust underneath the object to be loaded onto the truck.

The truck-body is provided with the usual bearing brackets C in which the axle D is journaled so as to permit the truck to be swung on the axle and the axle to revolve in said brackets.

E are the traction-wheels which are secured to the axle in any suitable manner.

Supports F are secured to the side bars adjacent the handles G into which the rear or upper ends of the side bars terminate.

Thus far the description relates to a truck of common construction, and as hand-trucks now in use differ in construction, I desire to be understood that the construction herein disclosed is merely a representative one and that my attachment to be now described may be attached to trucks differing in construction from that herein shown.

My attachment which I will designate by the letter H is essentially loosely supported and balanced on the axle of the truck so that its pivotal point, when in normal position, remains constant irrespective of what the position or angle of the truck-body may be. This attachment comprises two longitudinal bars I supported on the axle adjacent the traction-wheels, and connected at their front ends by a cross-bar J; the opposite ends of said longitudinal bars having laterally and oppositely extending flat pieces riveted thereto which serve as brake-shoes and are adapted to act with their side edges against the wheels and the floor, respectively. Said longitudinal bars are bent between their ends and normally rest with the crotch $j$ thus formed on the axle; the bars on opposite side of the said crotch being therefore inclined toward the floor. In order to hold the bars on the axle, a V-shaped clip K is riveted to the underside of each of the bars so that the axle is loosely inclosed within a diamond-shaped loop $k$ formed by the angular portion of the longitudinal bar and said clip. Said loops are slightly wider than the diameter of the shaft and therefore the brake attachment is suspended freely on the axle.

To the underside of the cross-bar J, a clip L is riveted to form a loop $l$ into which the front end of a foot-lever M extends; said lever having secured to its underside a clip N surrounding the axle, and having its rear end curved, as at O, to provide a convenient rest for the foot.

The brake-mechanism being loosely suspended on the axle, is balanced thereon and free to swing and in order to prevent undue swinging movement, I secure to the cross-bar $b$ of the truck a stop-bar P which has its free end in close proximity to the rear end of one of the longitudinal bars to limit the upward swinging movement of the device at the rear end thereof, while like movement is prevented at the front end of the device by a spring-bar R secured to the cross-bar $b^1$ of the truck and extending lengthwise of the truck with its free end in proximity to the cross-bar J of the brake-device.

When using the truck the operator places the nose thereof underneath the object to be placed upon the truck and simultaneously places his foot upon the operating-lever to cause the brake-shoes to be swung against the traction-wheels and floor. During this action the cross-bar J is swung into engagement with the spring-bar R, and the brake-device elevated at the center and forward end so that the axle fits into the bend of the clip. The operator may now support himself on the operating-lever, which assures a positive braking action, after which the object may be swung against the truck and the latter lowered. On releasing the foot-lever, the spring-bar R forces the brake-device into its normal position, after which the truck may be moved forward. By reason of the brake-shoes being flat with their side edges bearing against the traction-wheels and floor, respectively, the truck, when the brake-mechanism is set lightly, may be moved forward, but not backward, the brake-shoes when moving forward simply sliding over the floor.

This invention is susceptible to many changes in form, construction and arrangement without departing from the spirit of my invention and without sacrificing any of the advantages thereof.

Having thus described my invention, what I claim is,—

1. The combination with a truck having an axle and traction-wheels on said axle, of a brake-device having connected longitudinal arms bent between their ends to lie suspended on said axle, said arms having brake-shoes at one of their ends, and means to swing the brake-device on the axle to set said brake-shoes against the traction-wheels.

2. The combination with a truck having an axle and traction-wheels mounted thereon, of brake-mechanism comprising brake-arms having direct pivotal connection with the axle and having brake-shoes at their outer ends, said brake-shoes being normally out of contact with the traction-wheels and the floor, and an operating-lever having also direct pivotal connection with the axle and in operative connection with said brake-arms, said operating-lever adapted to swing the rear ends thereof toward the floor to bring the brake-shoes in contact with the traction-wheels and the floor.

3. The combination with a truck having an axle and traction-wheels, of brake-mechanism comprising two longitudinal bars lying on the axle at points between their ends and having corresponding ends connected, a brake-shoe carried at each of the other ends, means to hold said bars to the axle, and means to force the longitudinal bars down against the floor to bring the brake-shoes in contact with both the floor and the traction-wheels.

4. The combination with a truck having an axle and traction-wheels, of brake-mechanism comprising two longitudinal bars bent to direct opposite ends toward the floor, a brake-shoe at the rear end of each bar, a connection between the front ends of said bars, and a foot-lever fulcrumed on the axle and engaging the brake-mechanism to cause the brake-shoes to be swung against the traction-wheels and the floor.

5. The combination with a truck having an axle and traction-wheels, of brake-mechanism comprising two longitudinal bars bent between their ends and having loops at the bent portion to loosely surround the axle, brake-shoes at one of the ends of said bars, a bar connecting the other ends of said bars and having a loop, and an operating-lever pivotally connected to the axle and having its front end entering the last mentioned loop.

6. The combination with a truck having an axle and traction-wheels, of a brake-device having flat brake-shoes arranged to bear with their side edges against the traction-wheels and floor, respectively, when the brake-device is set.

7. The combination with a truck having an axle and traction-wheels, of a brake-device loosely suspended on the axle and comprising two longitudinal bars having brake-shoes at one of their ends and a rigid connection between their other ends, means secured to the truck to maintain said brake-device in normal position, and an operating-lever connected with the brake-device and adapted to swing the latter into its braking position.

8. The combination with a truck having an axle and traction-wheels, of a brake-device loosely suspended on the axle and comprising two longitudinal bars having brake-shoes at one of their ends and a cross-bar connecting their other ends, an operating-lever pivotally attached to the axle and having its front end connected to said cross-bar, a stop-bar extending from the truck and having its free end in proximity to the rear end of one of the longitudinal bars, and a spring-bar secured to the truck and having its free end in proximity to the said cross-bar, said spring-bar being engaged and deflected on swinging the brake-device into its braking position.

In testimony whereof, I have affixed my signature in the presence of two subscribing witnesses.

CHARLES F. SCHELL.

Witnesses:
EMIL NEUHART,
MAY F. SEWERT.